United States Patent [19]
Herrle et al.

[11] Patent Number: 5,992,594
[45] Date of Patent: Nov. 30, 1999

[54] FLUID FRICTION CLUTCH

[75] Inventors: Max Herrle, Stuttgart; Werner Hummel, Affalterbach; Gerold Schultheiss, Pforzheim, all of Germany

[73] Assignee: Behr GmbH & Co., Stuttgart, Germany

[21] Appl. No.: 09/203,594

[22] Filed: Dec. 2, 1998

[30] Foreign Application Priority Data

Dec. 4, 1997 [DE] Germany ............ 197 53 725

[51] Int. Cl.$^6$ ............... F16D 35/02
[52] U.S. Cl. ............... 192/58.61; 192/58.8
[58] Field of Search ............... 192/58.61, 58.8

[56] References Cited

U.S. PATENT DOCUMENTS

| 589,342 | 4/1897 | Light ............... 192/58.61 |
| 4,056,178 | 11/1977 | Detty . |
| 4,228,880 | 10/1980 | Gee . |
| 4,305,491 | 12/1981 | Rohrer . |
| 4,346,797 | 8/1982 | Bopp . |
| 4,633,994 | 1/1987 | Light . |
| 5,152,383 | 10/1992 | Boyer et al. . |

FOREIGN PATENT DOCUMENTS

| 0009415 | 4/1980 | European Pat. Off. . |
| 0130024 | 1/1985 | European Pat. Off. . |
| 0557808 | 9/1993 | European Pat. Off. . |
| 2718723 | 11/1977 | Germany . |
| 3109724 | 2/1982 | Germany . |

*Primary Examiner*—Richard M. Lorence
*Attorney, Agent, or Firm*—Evenson, McKeown, Edwards & Lenahan, P.L.L.C.

[57] ABSTRACT

Known fluid friction clutches, which are electromagnetically controlled from either an engine side or a driving side, require very strong and space-consuming coils in order to produce magnetic forces which are sufficient to control valve levers which, on the side of the clutch away from the coil, open or close a connection opening between a storage chamber and a working chamber. To address this problem, the magnet coil is placed as close as possible to the clutch housing and, by way of inserted flux guiding rings, achieve a magnetic shunt of the lines of magnetic flux such that the coil does not have to be overdimensioned. The flux guiding rings extend to just in front of an armature of the valve lever and, with small radial air gaps, to the housing of the coil. The rings can otherwise be arranged opposite the rotatable shaft made of a magnetic material. Such clutches are appropriate for use as fan clutches of vehicle engines.

20 Claims, 2 Drawing Sheets

FLUID FRICTION CLUTCH

This application claims the priority of German patent application No. 197 53 725.1, filed Dec. 4, 1997, the disclosure of which is expressly incorporated by reference herein.

BACKGROUND AND SUMMARY OF THE INVENTION

This invention relates to a fluid friction clutch having a primary disk fastened to a live shaft and an output clutch housing, which surrounds the primary disk, having a working chamber which is formed between the primary disk and the clutch housing and into which a shearing fluid can enter from a storage chamber as a function of the position of a valve plate having an armature. The valve plate opens and closes a connection opening between the storage chamber and the working chamber and can be adjusted against a spring effect into an opened or a closed position by a magnetic force caused by a stationary electromagnet coil arranged on the driven side of the shaft.

A liquid friction clutch of this type is known from German Patent Document DE 27 18 723 A1. In this type of construction, the magnetic flux from the electromagnet coil arranged on a stationarily held sleeve is transmitted exclusively by way of the live shaft to the armature of a valve plate arranged coaxially with respect to the shaft. Since the distance between the magnetic coil and the armature to be activated by its field is very large, the coil must have correspondingly large dimensions if a use is to be permitted at all in practice.

One object of this invention is to provide an improved arrangement for a fluid friction clutch which is electromagnetically controlled from the output side. The space requirement of this fluid friction clutch is low and its efficiency is clearly improved in comparison to the known construction.

In order to achieve this object, according to the invention, a fluid friction clutch of the initially mentioned type has the primary disk, or at least a hub of this disk, placed upon the shaft, constructed as a magnetic insulator and provided with a magnetic flux guiding ring. The flux guiding ring extends into the proximity of the armature of the valve plate and rests against the bearing for the clutch housing which is placed on the hub and is in a magnetic shunt with the electromagnet coil.

This development achieves a very effective magnetic field construction which, in turn, results in an electromagnet coil which will not become too large. This new fluid friction clutch is advantageous in that it can be controlled from the live side, that is, as a rule, from the engine side, and is extremely compact.

As a further development of the invention, a second flux guiding ring may be arranged concentrically within the first flux guiding ring and on an end of the shaft facing the valve plate. The second flux guiding ring also ends just in front of the armature of the valve plate. The magnetic field can thus be connected by way of the core area of the shaft.

As yet a further development of the invention, the two sleeve-shaped flux guiding rings can form the inner boundary of the storage chamber which is fixedly connected with the primary disk and is bounded to the outside by axially projecting ring ribs of the primary disk. In this construction, as a further development of the invention, axial boundaries of the storage chamber can be provided by the primary disk, on the one side, and by a separating wall, on the other side, which is fixedly inserted into the ring ribs and has a decentrally arranged connection opening which can be closed by the valve plate.

As a further development of the invention, this connection opening can be covered by a guiding plate on the side facing away from the storage chamber. The guiding plate guides the emerging shearing fluid directly into the outer area of the working chamber. As the result of this measure, the emerging shearing fluid can be supplied directly to the outer area of the working chamber which, as a rule, is constructed as a profile area. Depositing of shearing fluid on the interior side of the clutch housing, which also slowly rotates, is avoided.

As a further development of the invention, the storage chamber may also be divided into two concentrically arranged "areas" or volumes by the arrangement of two concentrically extending ring ribs which project axially from the primary disk. The area radially inside the interior ring rib is covered by another separation disk toward the second outer ring surface, which separation disk is provided with at least one flow-through bore. As a result of this measure, overfilling of the working chamber is avoided at low driving speeds. A shorter disconnecting time of the clutch can therefore be achieved at these low rotational or driving speeds. With a corresponding arrangement of the flow-through bore, at higher driving speeds, more and more shearing fluid from the inner part of the storage chamber will flow by way of the flow-through bore into the outer storage chamber. This fluid can flow from the outer storage chamber through the connection opening into the working chamber.

In yet another development of the invention, the sleeve-shaped flux guiding rings assigned to the armature of the valve plate also form a portion of the storage chamber and are therefore provided with radial overflow openings which open into the adjacent portions of the storage chamber. As a further development of the invention, in this embodiment, the return flow of the shearing fluid from the working chamber may take place in a known manner by way of pumping bodies and through a return flow opening which is arranged in a separating wall fixed to the clutch housing. This return flow opening advantageously is centrally arranged in the separating wall and is provided with a sleeve which leads into the central area of the storage chamber which is bounded by the inner sleeve-shaped flux guiding ring.

As an even further development of the invention, the valve plate may be arranged on the separating wall so as to swivel and may be swivellable about a spring joint which, when the magnetic coil is currentless, holds the valve plate in the opened position of the connection opening. As a result, the fluid friction clutch becomes fail-safe.

Finally, as a further development of the invention, it is possible to construct the outer sleeve-shaped flux guiding ring for the armature as a part which is integrally cast with the primary disk. The magnetic coil may adjoin the clutch housing as closely as possible and may be provided with flux guiding rings with radial gaps to the shaft. In this case, one of these flux guiding rings adjoining the magnetic coil may be fixedly pressed onto the shaft. A second flux guiding ring on the magnetic coil may be fixedly connected with it and, on its interior side, may form a very small radial gap with the shaft.

BRIEF DESCRIPTION OF THE DRAWINGS

An embodiment of the present invention is illustrated in the drawings and will now be described.

DESCRIPTION OF THE PREFERRED EMBODIMENTS

Figure 1:
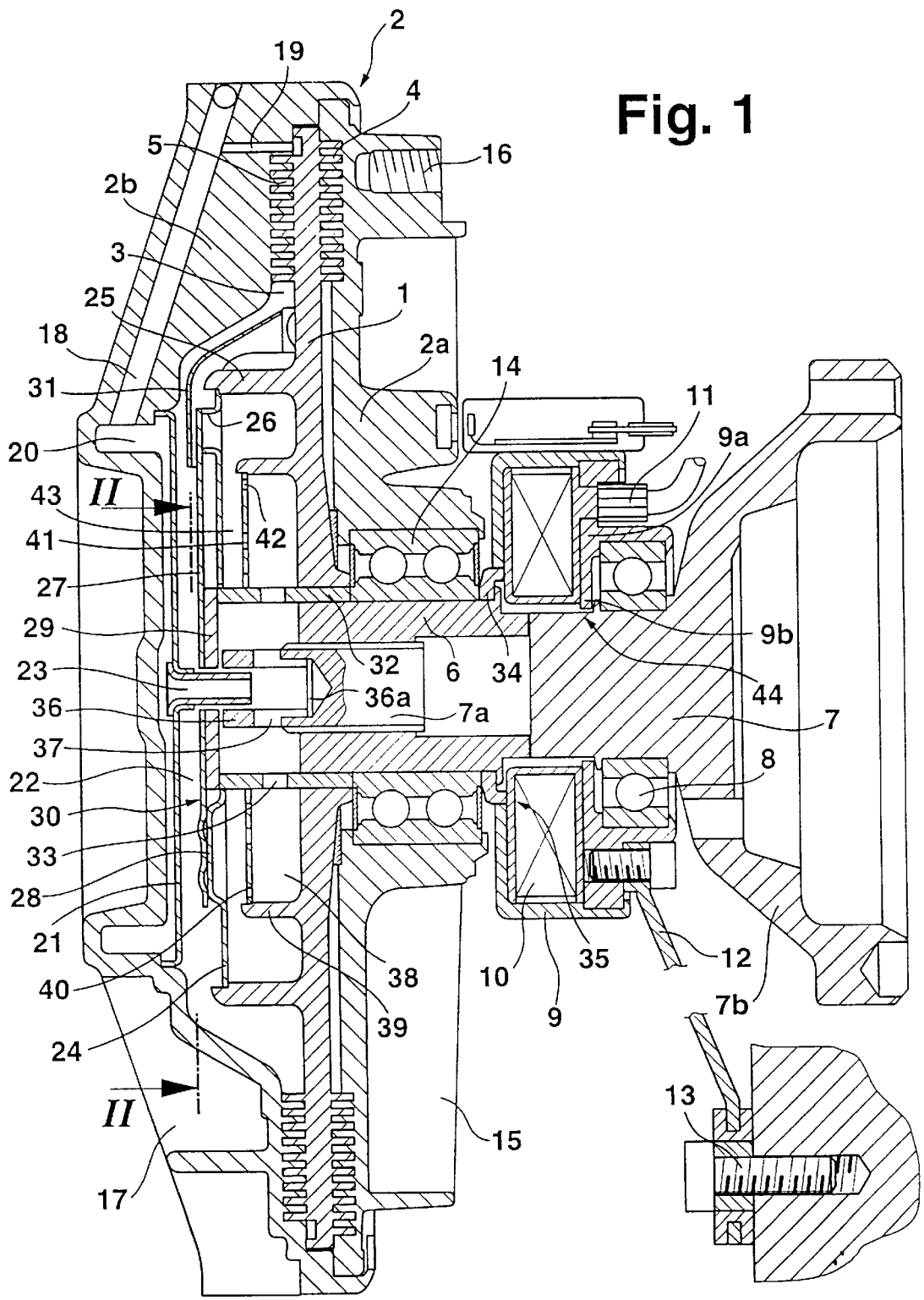
FIG. 1 is a schematic representation of a longitudinal view of a fluid friction clutch according to the invention.

FIG. 1 illustrates a fluid friction clutch which includes a driven primary disk 1 and a clutch housing 2 which is driven by the driven primary disk. The clutch housing is used as a secondary part and, in the illustrated embodiment, is constructed in two pieces for assembly reasons. The clutch housing consists of a first housing part 2a as well as a second housing part 2b which is fixedly connected to the first housing part 2a. The clutch housing 2 surrounds the primary disk 1 and, together with this disk, forms a working chamber 3 which is profiled in its radially exterior area in a known manner by surrounding ribs 4, which project from the primary disk 1, and surrounding ribs 5, which project from the housing parts 2a and 2b in order to enlarge the surfaces which come in contact with the shearing fluid during the coupling operation.

The primary disk 1 is constructed in one piece with a hub part 6 made of a nonmagnetic material and is screwed by this hub part 6 onto a journal 7a of a live (driving) shaft 7 which, on its end facing away from the journal 7a, changes into a fastening flange 7b which is also constructed in one piece with the shaft 7. This shaft 7 consists of steel. A holding device 9 for an electromagnet coil 10 is rotatably placed on this shaft 7 by way of a roller bearing 8. This holding device 9 has a shrouding ring 9a in which, on the one hand, the outer ring of the roller bearing 8 and a cable bushing 11 for the electromagnet coil 10 are accommodated but on which, on the other hand, a sheet metal holder 12 is also fastened. By way of a screwed connection 13, the sheet metal holder is stationarily mounted, for example, fixedly on the engine to which the clutch 2 is assigned. The electromagnet coil 10 therefore remains stationary when the shaft 7 is rotating.

The clutch housing 2 is rotatably held on the hub 6 of the primary disk 1 by way of roller bearings 14. On the housing part 2a, the clutch housing has approximately radially extending cooling ribs 15 and fastening openings 16 for blades, which are not shown, of a fan. The fan is driven by the fluid friction clutch for the engine cooler which is also not shown. On the cover part 2b of the clutch housing 2, cooling ribs 17 are also mounted. A flow duct 18 extends in at least one of these cooling ribs. The flow duct is connected on the outside with a connection bore 19 to the working chamber 3 and leads on the inside into a space 20 situated in the cover part. This space 20 is separated from the space 22 by a separating wall 21 which is inserted into the cover. The rotatable primary disk 1 is arranged in the space 22. The space 22 is connected with the working chamber 3 which, during operation of the clutch, is filled with a shearing fluid at least in its radially outer profiled area. In a known manner, this shearing fluid is returned through the bore 19 into the duct 18 and thus into the chamber 20 by way of pumping bodies which are arranged on the outside of the clutch housing. The pumping bodies become operative as a result of the different rotational speeds between the primary disk 1 and the clutch housing 2.

Figure 2:
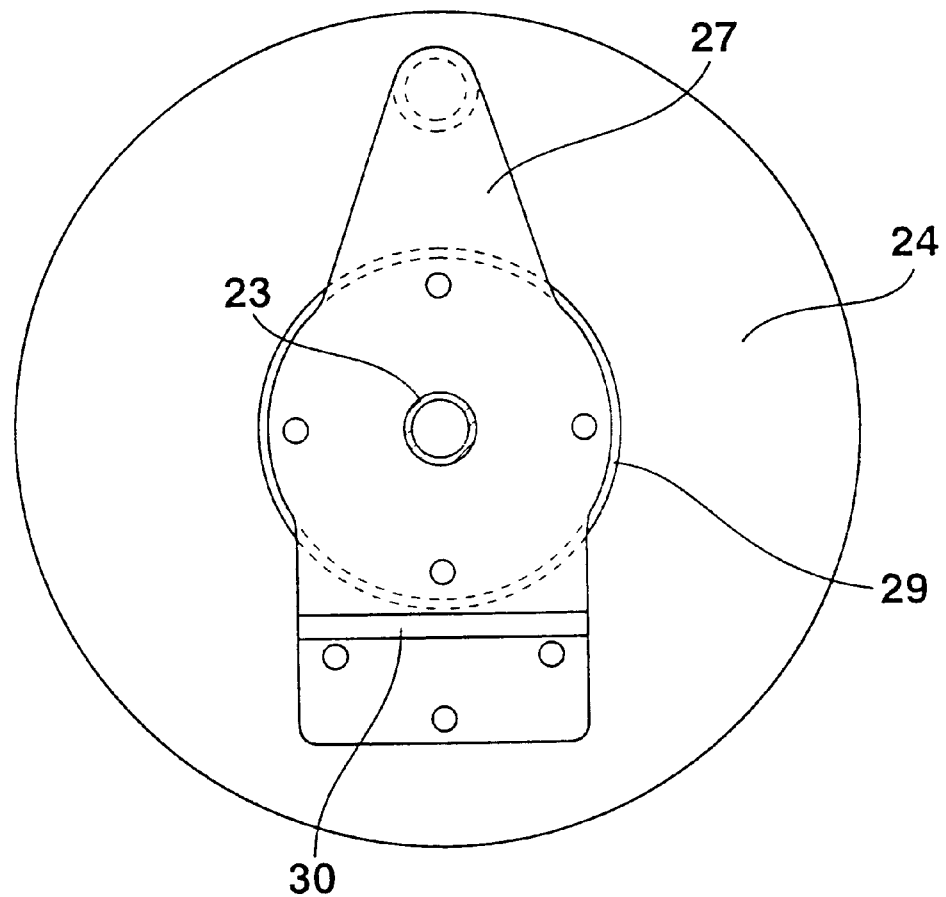
FIG. 2 is a view of the front side of the storage chamber arranged on the primary side as seen along section line II—II of FIG. 1.

From the chamber 20, an opening provided with a sleeve 23 leads through the chamber 22 into an area which is situated behind a separating wall 24 which is arranged in the chamber 22 and which is tightly inserted into a ring rib 25 of the primary disk 1 axially projecting into the space 22. The separating wall 24 has an off-center connection opening 26 which is closed in the illustrated position of a valve lever 27 fastened to a shaped-out area 28 of the separating wall 24. As also illustrated in FIG. 2, this valve lever 27 is provided in its central area with an armature disk 29 consisting of a magnetic material. The valve lever is provided with a spring joint 30 adjoining its fastening section on the shaped-out area 28. When the magnet coil 10 is not acted upon by current, the spring joint 30 swivels the valve lever 27 in the counterclockwise direction as viewed in FIG. 1 toward the outside until the end of the lever, which covers the connection opening 26, strikes against a shearing fluid guiding plate 31 which covers the connection opening 26 and is fixedly connected with the primary disk 1.

The separating wall 24 is open in its central area and the free front edge of a flux guiding ring 32, consisting of a magnetic material, projects into the corresponding opening. The flux guiding ring 32 is provided with radial openings. This flux guiding ring 32 is inserted as an integrally cast part into the primary disk 1 and is provided with recesses in the integrally cast area. In this manner, at least one finger of the flux guiding ring extends, and preferably several fingers of the flux guiding ring extend, to the inner ring of the roller bearing 14. On the side facing away from the flux guiding ring 32, the inner ring of the roller bearing adjoins another flux guiding ring 34 which is pressed onto the hub 6 and forms with the housing-type holding device 9 of the electromagnet coil 10, which consists of a magnetic material, a very small radial air gap 35. This air gap is just large enough so that, when the shaft 7 is rotated, no contact occurs with the stationary holding device 9. In practice, a radial air gap of from 0.1 to 0.2 mm was found to be expedient.

As illustrated in FIG. 1, another flux guiding ring 36 is arranged concentrically with respect to the flux guiding ring 32 and, like the flux guiding ring 32, has a sleeve shape. This other flux guiding ring is fixedly inserted into an opening of the shaft journal 7a by one foot 36a. The sleeve-shaped flux guiding ring 36 also has radial passage openings 37 so that, through the sleeve 23, a shearing agent returning from the working chamber 3 during the operation of the clutch can enter into the space within the flux guiding ring 36. From there, by way of the openings 33, the shearing agent can enter into a chamber 38. This chamber is formed by a ring rib 39 extending concentrically with respect to the ring rib 25 and also projecting axially in one piece from the primary disk 1 and by another separating wall 40 inserted into the ring rib 39. In the illustrated embodiment, this separating wall 40 is provided with bores 41 and 42 arranged in its radially exterior area, which bores 41 and 42 establish the connection between the inner chamber 38 and the chamber 43 which is enclosed by the ring rib 25 and the separating wall 24.

FIG. 1 also shows that the holding device 9 for the electromagnet coil 10, by way of its part accommodating the inner ring of the roller bearing 8 and also consisting of a magnetic material, forms a flux guiding ring. By way of its interior edge 9b, the holding device forms a radial air gap 44 with the shaft 7 which is also on the order of from 0.1 to 0.2 mm. This radial air gap 44, therefore, like the radial air gap 35, is large enough to avoid contact between the parts which rotate against one another but small enough so that excessive resistance to the magnetic flux is not provided. It was found that axial air gaps, as they are partially provided in the prior art for flux guiding, are much more disadvantageous in this respect.

The method of operation of the new fluid friction clutch is as follows:

In the illustrated position of FIG. 1, the magnet coil 10 is acted upon by current. In this case, the magnetic flux takes place by way of the armature 29 of the valve lever 27 constructed in the shape of a disk, by way of the flux guiding ring 32 to the inner ring of the roller bearing 14 and, from there, by way of the flux guiding ring 34 and the radial air gap 35 to the holding device 9 of the electromagnet coil 10. The magnetic circuit is closed by way of the radial air gap 44 as well as by way of the core area of the shaft 7 and the flux guiding ring 37 which, on the inside, is opposite the armature 29. In the illustrated closed position of the valve lever 27, the armature disk 29 rests on the outside of the flux guiding ring 32. In order to avoid magnetic adhesion, however, the inner flux guiding ring 36 is not pulled forward to the armature disk 29 but has a residual axial air gap of from 0.1 to 0.2 mm. During operation, no relative movement takes place between the armature 29 and the pertaining pole elements which are formed by the flux guiding rings 32 and 36. Consequently, the most effective range of the magnetic force course can be utilized in a targeted manner. By way of this embodiment, the power of the electromagnet coil 10 and, therefore, its dimension as well can be kept relatively small so that the overall clutch has a compact construction.

If the current supply by way of the cable bushing 11 to the electromagnet coil 10 is switched off, then the magnetic field will collapse. The valve lever 27 is then lifted off the opening 26 by the effect of its spring joint 30 so that the shearing fluid can flow by way of the connection opening 26 into the working chamber 3.

The above demonstrates that the storage chamber for the shearing fluid is assigned to the driven primary disk 1. The rotational idling speed of the fan, which can be adjusted by the new clutch, therefore does not depend on hydraulic torque transmission. This rotational idling speed can be lowered to a level resulting from the basic body bearing friction (approximately 100 revolutions per minute). In known clutches, storage chambers are usually assigned to the clutch housing.

As FIG. 1 also illustrates, the storage chamber for the shearing fluid is divided into two chambers, specifically the inner chamber 38 and the outer chamber 43. In this case, as mentioned above, the return flow of shearing fluid takes place by way of the sleeve 23 into the inner chamber 38 via the radial overflow openings 37 and 33. Therefore, because of the two-part storage chamber, for a fast connection of the clutch, only the shearing fluid in the outer chamber 43 is initially available. When the connection opening 26 is open, this shearing fluid can exit into the working chamber 3. However, at higher driving speeds, fluid will flow at an increasing rate from the inner storage chamber 38, by way of the openings 41 and 42 constructed as throttle bores, into the outer storage chamber 43. More shearing fluid will therefore be available for transmitting the higher torques required at these rotational speeds. On the other hand, this two-part construction of the storage chamber avoids an overfilling of the working space (the profiled space between the ribs 4 and 5) at low rotational driving speeds and, thus, a shorter disconnection time of the clutch can be achieved at these rotational speeds.

Instead of being provided with the throttle bores 41, 42, the two storage chambers 38 and 43 may be provided with a centrifugal-force-dependent valve which opens and closes as a function of the rotational speed. However, the function, which will be more precise in this case, will then require significantly higher constructional expenditures.

The shearing fluid will be delivered by the known baffle barrier pump from the working chamber 3 via the duct 19, as described, into the duct 18. The shearing fluid flows through the area provided with the cooling ribs 17 and can therefore be cooled so that the returning shearing fluid can be centrifuged at the lowest possible temperature by way of the sleeve 23 and the radial overflow openings 37 and 33 back into the inner storage chamber 38.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Fluid friction clutch comprising:

a primary disk, a live shaft to which the primary disk is fastened which consists of a magnetically active material, an output clutch housing, which surrounds the primary disk, having a working chamber which is formed between the primary disk and the output clutch housing, a valve plate having an armature situated in an area of the shaft so that a shearing fluid can enter from a storage chamber as a function of a position of said valve plate, said valve plate opening and closing a connection opening between the storage chamber and the working chamber, and a stationary electromagnetic coil by which the valve plate can be adjusted against a spring effect into an opened position or a closed position by a magnetic force caused by the stationary electromagnet coil, said stationary electromagnetic coil being arranged on a driven side of the shaft, wherein the primary disk or at least its hub placed on the shaft is constructed as a magnetic insulator and is provided with a magnetic flux guiding ring which extends into the proximity of the armature of the valve plate and rests against a bearing for the clutch housing which is placed onto the hub and forms a magnetic shunt with the electromagnet coil.

2. Fluid friction clutch according to claim 1, wherein said magnetic flux guiding ring is a first flux guiding ring, and further comprising a second flux guiding ring which is arranged concentrically within the first flux guiding ring and on a front end of the shaft facing the valve plate.

3. Fluid friction clutch according to claim 2, wherein the flux guiding rings project into the storage chamber for the shearing fluid which is fixedly connected with the primary disk and is bounded toward its outside by axially projecting ring ribs of the primary disk.

4. Fluid friction clutch according to claim 3, wherein an axial boundary of the storage chamber is defined by a separating wall which is fixedly inserted into one of the ring ribs and which has the connection opening which can be closed by the valve plate arranged decentrally therein.

5. Fluid friction clutch according to claim 4, wherein the connection opening is covered on a side facing away from the storage chamber by a guiding plate which guides emerging shearing fluid directly into an outer area of the working chamber.

6. Fluid friction clutch according to claim 4, wherein the storage chamber is divided into two concentrically arranged areas by arranging the two of said axially projecting ring ribs so that they extend concentrically.

7. Fluid friction clutch according to claim 6, wherein an area radially inside an inner ring rib of the axially projecting ring ribs is covered by a separating disk toward a second storage chamber area formed by one of said concentrically arranged areas, said separating disk being provided with at least one flow-through bore constructed as a throttle bore.

8. Fluid friction clutch according to claim 6, wherein the flux guiding rings are sleeve-shaped and project into the storage chamber and are provided with radial overflow openings to other parts of the storage chamber.

9. Fluid friction clutch according to claim 2, wherein return flow of the shearing fluid is guided from the working chamber by way of pump bodies and guide ducts as well as by way of a return flow opening arranged in a separating wall fixed to the clutch housing.

10. Fluid friction clutch according to claim 9, wherein the return flow opening is arranged centrally in the separating wall.

11. Fluid friction clutch according to claim 10, wherein the return flow opening includes a sleeve which projects into a central area of the storage chamber bounded by the flux guiding rings.

12. Fluid friction clutch according to claim 4, wherein the valve plate is swivellably arranged on the separating wall.

13. Fluid friction clutch according to claim 12, wherein the valve plate can be swivelled about a spring joint and, when the electromagnet coil is currentless, is in the opened position and opens the connection opening.

14. Fluid friction clutch according to claim 2, wherein the flux guiding rings form inner and outer magnetic flux guiding rings and at least the outer magnetic flux guiding ring is constructed as an integrally cast part with the primary disk consisting of nonmagnetic material and its hub.

15. Fluid friction clutch according to claim 1, wherein the electromagnet coil adjoins the clutch housing as closely as possible and is provided with additional magnetic flux guiding rings which, with radial air gaps, surround the shaft consisting of magnetic material.

16. Fluid friction clutch according to claim 15, wherein one of the additional magnetic flux guiding rings is connected with the magnetic flux guiding ring and is fixedly pressed onto the hub of the primary disk.

17. Fluid friction clutch according to claim 16, wherein a further flux guiding ring is constructed as part of a holding device for the electromagnet coil and has an inner circumference which forms a narrow radial gap with respect to the shaft.

18. Fluid friction clutch according to claim 17, wherein the one of the additional flux guiding rings has a small radial air gap with respect to the holding device for the electromagnet coil.

19. Fluid friction clutch comprising:
 a magnetic flux producing electromagnetic coil,
 a primary disk defining a magnetic insulator,
 a clutch housing surrounding the primary disk,
 a bearing, disposed between a hub of said primary disk and said clutch housing, rotatably holding the housing on the hub,
 a valve plate responsive to magnetic flux produced by the electromagnetic coil to selectively open and close a connection opening between fluid storage and working chambers defined within the clutch housing, and
 a magnetic flux guiding ring, resting against said bearing and extending between said primary disk and said valve plate, which forms a magnetic shunt for the electromagnetic coil.

20. Fluid friction clutch according to claim 19, and further comprising a magnetically active shaft on which said hub is secured and another magnetic flux guiding ring arranged concentrically within the magnetic flux guiding ring between an end of said shaft and said valve plate.

* * * * *